Figure 1:
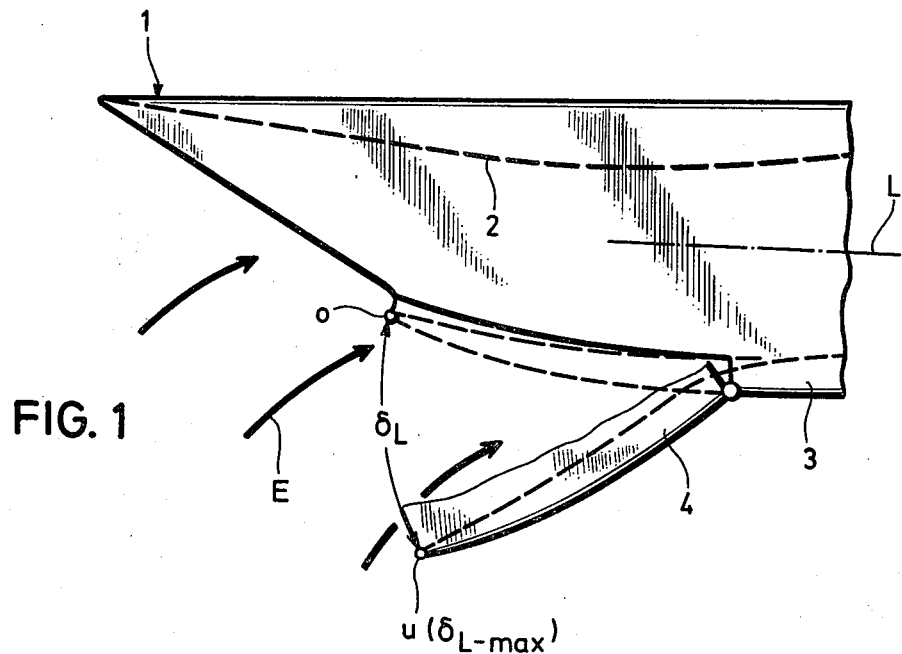

United States Patent [19]

Schulze et al.

[11] 4,418,708
[45] Dec. 6, 1983

[54] TWO-DIMENSIONAL, UNILATERAL OBLIQUE SHOCK DIFFUSER AS THE AIR INLET FOR A GAS TURBINE JET ENGINE FOR THE PROPULSION OF HEAVY-DUTY AIRCRAFT

[75] Inventors: Carsten Schulze, Götting; Kurt Lotter, Riemerling; Jakob Malefakis, Putzbrunn, all of Fed. Rep. of Germany

[73] Assignee: Messerschmitt-Bölkow-Blohm Gesellschaft mit beschränkter Haftung, Ottobrunn, Fed. Rep. of Germany

[21] Appl. No.: 239,021

[22] Filed: Feb. 24, 1981

[30] Foreign Application Priority Data

Mar. 12, 1980 [DE] Fed. Rep. of Germany ....... 3009340

[51] Int. Cl.$^3$ ............................................. F02C 7/042
[52] U.S. Cl. .................................. 137/15.2; 244/53 B
[58] Field of Search ........................... 137/15.1, 15.2; 244/53 B

[56] References Cited

U.S. PATENT DOCUMENTS 3,027,118  3/1962  Willox ............................ 244/53 B
3,141,300  7/1964  Turcat ............................ 244/53 B
3,186,661  6/1965  Denning et al. ................. 244/53 B

FOREIGN PATENT DOCUMENTS 1066429   9/1961  Fed. Rep. of Germany .
1066428  12/1961  Fed. Rep. of Germany .
1125773   3/1962  Fed. Rep. of Germany .... 244/53 B

OTHER PUBLICATIONS

Pratt & Whitney Aircraf, the Aircraft Gas Turbine Engine and its Operation, May 1974, pp. 59-60.

*Primary Examiner*—Stephen C. Bentley
*Attorney, Agent, or Firm*—Toren, McGeady and Stanger

[57] ABSTRACT

A two-dimensional, unidirectional oblique air impact diffuser is used as an air inlet for a gas turbine jet engine for aircraft. The air inlet includes an upper rigid air inlet ramp and an air inlet bottom spaced below the ramp. An air scoop lip is pivotally attached to the air inlet bottom so that it can be pivoted from a standard setting point downwardly away from the air inlet ramp and also from the standard setting point toward the ramp. The pivotal displacement of the air scoop lip is a function of the aircraft angle of attack and the flight Mach number. The angular displacement of the air scoop lip from the standard setting point increases downwardly as the aircraft angle of attack increases and decreases as the Mach number increases.

1 Claim, 4 Drawing Figures

TWO-DIMENSIONAL, UNILATERAL OBLIQUE SHOCK DIFFUSER AS THE AIR INLET FOR A GAS TURBINE JET ENGINE FOR THE PROPULSION OF HEAVY-DUTY AIRCRAFT

The invention relates to a two-dimensional, unilateral unidirectional oblique shock or air impact diffuser as an air inlet for a gas turbine jet engine for the propulsion of high-performance aircraft, having upper rigid ramps, the leading edge of which is advanced ahead of the frontal end of the inlet bottom.

The job of an aircraft air inlet is to convert a maximal amount of the kinetic energy of approach flow air to compressed-air energy. Specifically with higher mach numbers this energy recovery can be of a considerable amount. To optimize the latter the scooped-up and compressed air must not exceed minimal losses and must be fed in a homogeneous state in a properly metered amount to the engine according to the latter's instantaneous output. Flow losses are primarily produced by air friction, compression shocks, and overflow drags. In this case specific attention must be paid to external flow drags, which must be kept at a minimal level. Inhomogeneous air conditions primarily result from pressure inequalities within the flow itself. A sucessful avoidance to a maximal extent of above problems produces a propulsion system comprising air inlet and gas turbine engine with a high-efficiency thrust in all output ranges. This then guarantees to a high extent an aerodynamically stable cooperation between air inlet and engine. On starting and at very low flight speeds the air—because of the low pressure prevailing at the inlet end—is fed to the engine at a high volume, which means that the air inlet's mechanically narrowest flow cross-section must be maximally dimensioned. On the other hand, in high supersonic flight the air volume at the inlet end—because of the prevailing high pressure there—is extremely low, which means that the mechanically narrowest flow cross-section must be minimally dimensioned, so that in the air inlet entrance area the required level of shock waves can be maintained. Furthermore, today's high-performance fighter aircraft must meet aerial combat standards particularly in the subsonic range. This type of operation calls for high aircraft angles of attack. On start and in subsonic flight with high angles of attack and maximal engine air thruput, therefore, the airscoop area must be maximally large-dimensioned; by contrast, the latter for minimal air thruput in the supersonic range, e.g., under relatively high air temperature, partial-load operational and high mach-numerical conditions, must be small-dimensioned. These divergent requirements cannot be met by an air inlet equipped with a rigid scoop area, because the latter type with subsonic flight produced extreme angles of attack starts a surging effect because of the inlet flow breakdown effective on a rigid inlet lip, and with low engine air requirements in supersonic flight it can cause shockwave oscillation produced inlet ripples, which lead to propulsion system instabilities. Thus, because a rigid air inlet with steep angles of attack has only a narrowly limited stable operating range, for high-performance engines a variable air inlet is provided, which is controlled or varied as a function of various flight parameters.

Both German patent specs 1,066,428 and 1,066,429 disclose two-dimensional supersonic air inlets, the frontal sections of which are developed over and under the central shock taper as swivelable airscoop lips. This involves bilateral oblique shock diffusers, not related to the present invention, because they show drawbacks under specified flight conditions, which are to be eliminated by the present invention. Thus, designwise the bilateral oblique shock diffuser is not only substantially more expensive and requires a bigger space for built-in cells but in relatively sharp-turn flight with high angles of attack it is accompanied by an air inlet cross-sectionally rated uneven air flow. This can lead to irregular compressor operation with consequent engine output drop in particularly critical situations.

As previously noted, a rigid air inlet has relatively only a very limited stable operating range. For high-performance aircraft, therefore, a variable air inlet is provided. Such a type, e.g., is disclosed by British patent specification No. 932,751. In this case the inlet geometry is varied by timing an upper movable ramp, and an airscoop lip frontally linked to the air inlet bottom. Thereby this variable air inlet is so regulated that in subsonic operation the inlet cross-section is maximized by pulling up the upper ramp and slightly downward swiveling the airscoop lip, and in supersonic operation the air inlet cross-section is minimized by lowering the upper ramp and pulling up the airscoop lip. How to set the wellknown air inlet so that even extremely high aircraft angles of attack can be managed under still acceptable air inlet conditions is not being taught by this patent specification. Moreover, supersonic air inlets with bilateral timing, i.e., with timeable upper ramps and movable airscoop lips are high-input and expensive designs plus require particularly complex controls such as automatic controllers and actuator devices.

At this point the object of the invention is to create a timeable air inlet of simplest design and to develop same by comparison with the state of art and modify its operation so that over the entire subsonic-and supersonic flight range—even under extreme flight conditions, specifically extremely steep angles of attack, and in the starting phase—optimal air inlet operating conditions are guaranteed.

This problem with a supersonic air inlet of the initially described type is solved according to the invention by an airscoop lip movably arranged at the front of the air inlet bottom with a large downward swivelability, so that, the set angles of which over the entire swiveling range, which is limited by a top set point (o) with set angle ($\delta_{Lo}=0°$) and a bottom set point (u) with max set angle ($\delta_{L-max}$), are determined as a function of respective angle of attack ($\alpha$) and respective mach number (M) according to the function relationship $\delta_L = f(\alpha, 1/M)$. This setting made for the bottom airscoop lip formulates that with rising angle of attack $\alpha$ the set angle $\delta_L$ is raised, i.e., thereby the airscoop lip is swiveled further downwardly, while with rising mach number M the airscoop lip is swiveled further upwardly and thereby decreases the air inlet cross-section. From a control-and-automatic control engineering point of view both angle of attack $\alpha$ and mach number M-values are input in the control or automatic control unit and there—in the proposed sense—evaluated or computerlogically coordinated, whereby the resultant set angle is determined.

For example, with the occurrence of steep aircraft angles of attack, specifically with relatively sharp-turn loops during air combat in the subsonic range the airscoop lip is sharply lowered, so that flow breakdowns and that way surgings are avoided. A further high supersonic operation rated capability is to supply engine required air thruputs always at a point somewhat exceeding the critical operating point, that is at a slightly subcritical level, i.e., always at a point with a minimal drag, by way of an adequate timing of the inlet geometry. The actual result is a constant maximal pressure recovery resp. air thruput. For this purpose, to narrow the air inlet cross-section the airscoop lip is pulled up beyond an assumed standard position, which is equivalent to the position of a rigid airscoop lip. This way particularly any inlet rippling is avoided.

This means that rising angles of attack require a rise in timing angles of the airscoop lip, which thereby is downward swiveled, whereby the setangular value for the respective angle of attack is properly corrected, i.e., decreased by the respective mach numerical value.

In developing the invention for extreme angles of attack a maximal set angle for the airscoop lip between 40° and 50° is proposed.

By comparison with the known state of art the invention excels by the management of extremely steep angles of attack in the subsonic range and still very low air thruputs with high-efficiency ratings made possible by a single, relatively simple desinged timing device.

This optimal stage with steep angles of attack is reached in such a way that thereby the flow of air approaching the air inlet at a relatively wide-angular slant to the aircraft longitudinal axis can be supplied with an inlet configuration of constantly optimizing thruput coefficients.

Figure 2:
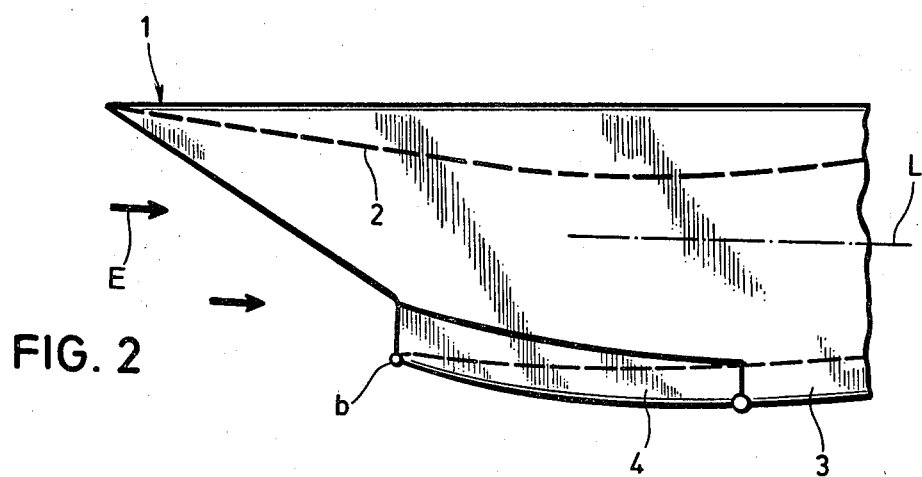
Figure 3:
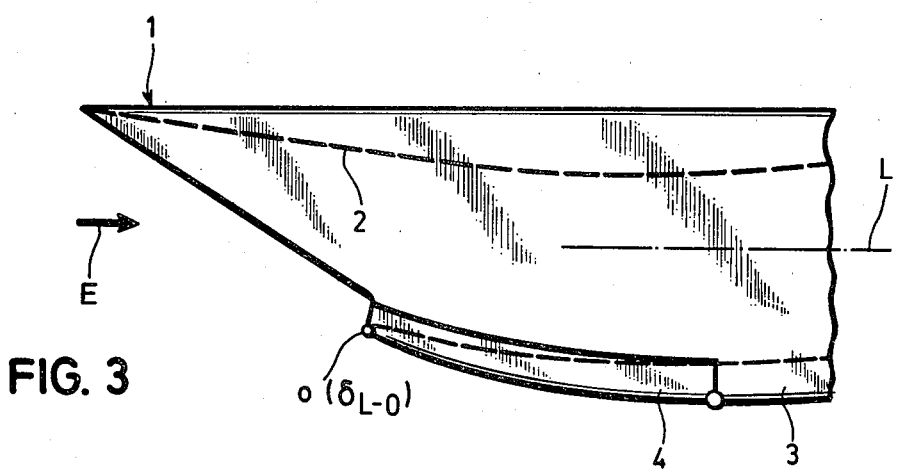
Figure 4:
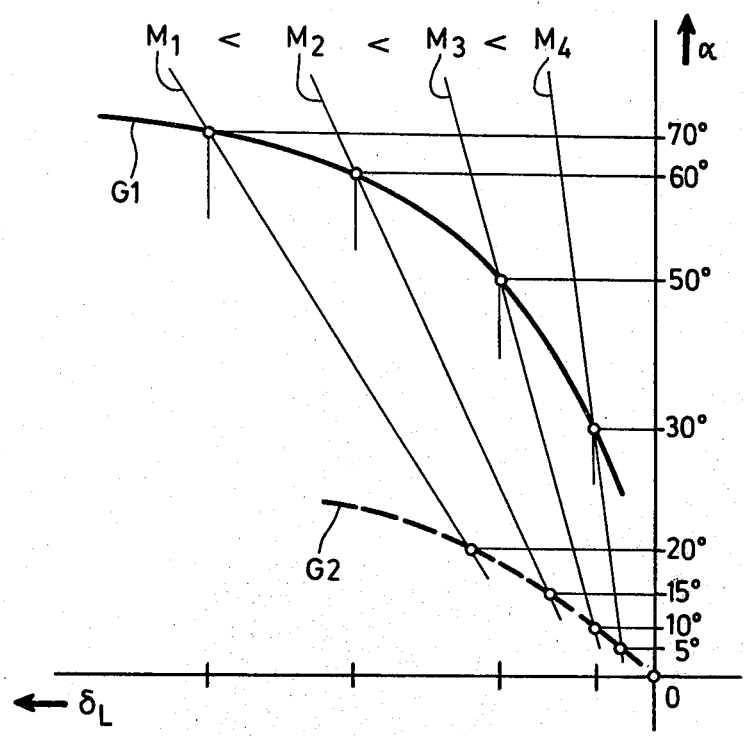

The drawing shows an exmplified embodiment according to the invention, namely the FIGS. 1 thru 3 of a unilateral or unidirectional, two-dimensional oblique shock diffuser in three various operational settings, and FIG. 4, which shows a characteristic field for timing the airscoop lip over the entire flight speed range.

As shown in FIG. 1, with a unilateral or unidirectional, two-dimensional oblique shock or air impact diffuser having an upper advanced shock taper or air impact wedge 1, and a rigid upper air inlet ramp 2, an airscoop lip 4 is frontally linked to the air inlet bottom 3. In case of flying great angles of attack $\alpha$, where inlet flow E is slantwise to flight longitudinal axis L, the airscoop lip 4 is steeply downward swiveled (set point u) to a maximal set angle $\delta_{L\text{-}max}$ of about 30° to 50° with reference to an assumed standard setting b.

FIG. 2 shows said standard setting point b of airscoop lip 4. The setting range of airscoop lip 4 between set points u and b indicates the subsonic-and transonic speed range.

In the supersonic speed range the airscoop lip 4, with rising supersonic speed, is moved from set point b to upper set point o, as shown in FIG. 3.

As schematized in FIG. 4, the characteristic field for the airscoop lip 4's entire timing range (timing angle $\delta_L$) shown there between lower set point u and upper set point o is characterized in that on the ordinate the angles of attack $\alpha$, and on the abscissa the set angles $\delta_L$ for airscoop lip 4 are plotted, while in the characteristic field itself a number of mach number lines $M_1$, $M_2$, $M_3$, $M_4$... are sequenced, whereby $M_1 < M_2 < M_3 < M_4$... is. The top aerodynamic limit G1 must not be exceeded to avoid in the subsonic and transonic speed ranges any surging by flow breakup on resp. in the air inlet, and in the supersonic speed range any inlet rippling by compressor oscillation. This diagram shows that—extremely high angles of attack $\alpha$ notwithstanding—still usable air inlet conditions for the engine can be obtained by a maximal pull-down or airscoop lip 4. The same applies to relatively high mach numbers ($M_4$) in the supersonic range, where, of course, operations with only relatively narrow set angles $\delta_L$ are effective.

In contradistinction to that the lower phantom characteristic G2 shows that with given speeds $M_1$, $M_2$, $M_3$, $M_4$... without any airscoop lip timing, that is with an assumed rigid airscoop lip, only relatively narrow angles of attack $\alpha$ are tolerable unless engine surging and inlet rippling are accepted risks.

The $M_1$, $M_2$, $M_3$, $M_4$... lines represent target characteristics, which mark control-or automatic control system triggered respective set angles $\delta_L$ for relatively high, specifically maximal engine air thruputs as a function of the respective angle of attack $\alpha$. The function relationship $\delta_L = f(\alpha 1/M)$ means that with rising angle of attack $\alpha$ the set angle $\delta_L$ is increased and with an increase in the mach number the set angle decreases, and vice versa. In the function relationship $\delta_L = f(\alpha, 1/M)$ both main parameters $\alpha$ and M can indicate factors, which modify the proportional and inversely proportional functions effective between individual values on a linear or progressive or degressively tapering scale.

We claim:

1. Two-dimensional, unidirectional oblique air impact diffuser as an air inlet for a gas turbine jet engine for the propulsion of a high-performance aircraft operationable in the subsonic, transonic, and supersonic ranges, comprising a rigid upper air inlet ramp forming the upper side of the air inlet, said air inlet ramp having a leading edge facing in the direction of flight, an air inlet bottom spaced downwardly from said air inlet ramp and forming the lower side of the air inlet, said air inlet bottom having a leading edge facing in the direction of flight and spaced rearwardly of the leading edge of said air inlet ramp, characterized by an air scoop lip (4) pivotally attached to the leading edge of said air inlet bottom and extending in the direction toward the leading edge of said air inlet ramp with the leading edge of said air scoop lip spaced between the leading edge of said air inlet ramp and said air inlet bottom, said air scoop lip having a standard setting point with the surface of said air scoop lip forming an aligned continuation of said air inlet bottom, in the range of subsonic and transonic operation said air scoop lip is pivotally displaceable downwardly away from said air inlet ramp to a maximum angle from the standard setting point in the range of 30° and 50° and in the range of supersonic operation said air scoop lip is pivotally displaceable closely upwardly toward said air inlet ramp from the standard setting point, and the position of said air scoop lip relative to the standard setting point is determined as a direct function of the aircraft angle of attack and as an inverse function of the flight Mach number.

* * * * *